United States Patent [19]
Tosi

[11] Patent Number: 4,536,958
[45] Date of Patent: Aug. 27, 1985

[54] TWIN ELEMENT, CYLINDRICALLY DISASSEMBLABLY HINGED TOOL

[75] Inventor: Riccardo Tosi, Valle Ceppi-Pino Torinese, Italy

[73] Assignee: Merisinter S.p.A., Arzano, Italy

[21] Appl. No.: 443,743

[22] Filed: Nov. 22, 1982

[30] Foreign Application Priority Data

Jun. 17, 1982 [IT] Italy ................. 48665 A/82

[51] Int. Cl.³ .............. A47J 43/26; B26B 17/00
[52] U.S. Cl. .................. 30/120.3; 16/356; 16/363; 16/DIG. 29; 81/300; 81/416
[58] Field of Search ............ 16/355, 356, 362–364, 16/374, 377, 386, DIG. 29; 30/120.3, 120.5, 266, 253–262; 403/163; 81/416, 300, 428 R

[56] References Cited

U.S. PATENT DOCUMENTS 1,128,620  2/1915  Munzner .................. 16/363 X
2,142,738  1/1939  Wakeley .................... 30/253

FOREIGN PATENT DOCUMENTS 531430  1/1922  France .................... 30/120.3

*Primary Examiner*—Douglas D. Watts
*Attorney, Agent, or Firm*—Michael J. Striker

[57] ABSTRACT

A tool, particularly a nut-cracker, consisting of two twin elements each having at one end a projection shaped as a cylinder sector surrounded by an annular element forming an eyelet and by a circle sector shaped tongue, concentrical with respect to said cylinder sector shaped projection, so as to attain, by inserting said projection of one element into the eyelet formed by the annular portion of the other one element, a tool with two elements or movable hinged arms, with a rotational axis coincident with the geometrical axis of said cylinder sector projections.

3 Claims, 2 Drawing Figures

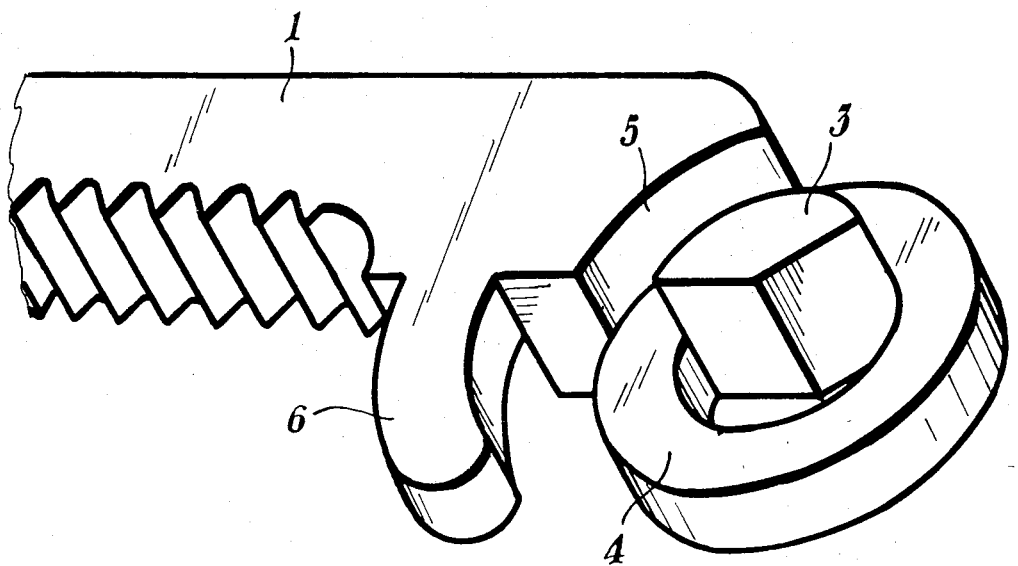
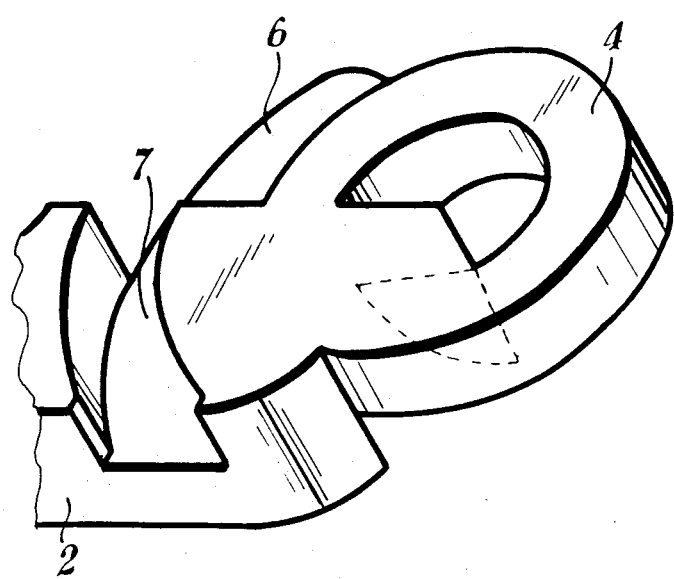
fig. 2

TWIN ELEMENT, CYLINDRICALLY DISASSEMBLABLY HINGED TOOL

The present invention relates to a cylindrical hinge which allows an independent rotation of one or more movable elements and which, while maintaining both the same functional characteristics and utilization possibilities of the conventional cylindrical hinges, differs mainly therefrom in that rotation of the parts is performed by a single piece stud, that is a stud which is not an applied part. The movable elements themselves form a cylindrical hinge at their end portions by coupling with one another, thereby allowing the mutual movement of these elements. Moreover, engagement and disengamement are performed in a quick and precise manner and the two elements forming the hinge may be joined and disjoined at will with respect to one another, without any need for locking tools.

According to the invention, a hinge is provided which consists of two twin elements, each of them having at one end a cylindrical sector shaped projection cooperating with an eyelet of the other element, so as to form, when assembed with one another, a hinge allowing free rotation of the two twin elements around an axis which coincides with the geometrical axis of said cylinder sector shaped projections.

Furthermore, according to the invention each of the two elements has a circle sector shaped tongue concentric to said cylinder sector projection and cooperating with a corresponding seat in the twin element, so as to operate as a guide for the rotation of the two twin elements and to allow quick engagement and disengagement of the two twin elements only when they are at an opening end position.

The invention will now be described with reference to the attached drawings which show for illustrative but non limiting purposes a preferred embodiment thereof in connection with a nut-cracker.

BRIEF DESCRIPTION OF THE DRAWINGS

FIG. 2 is an enlarged view of a detail of the two engageable end portions of the two twin elements pursuant to the invention.

DETAILED DESCRIPTION OF THE PREFERRED EMBODIMENTS

Figure 1:
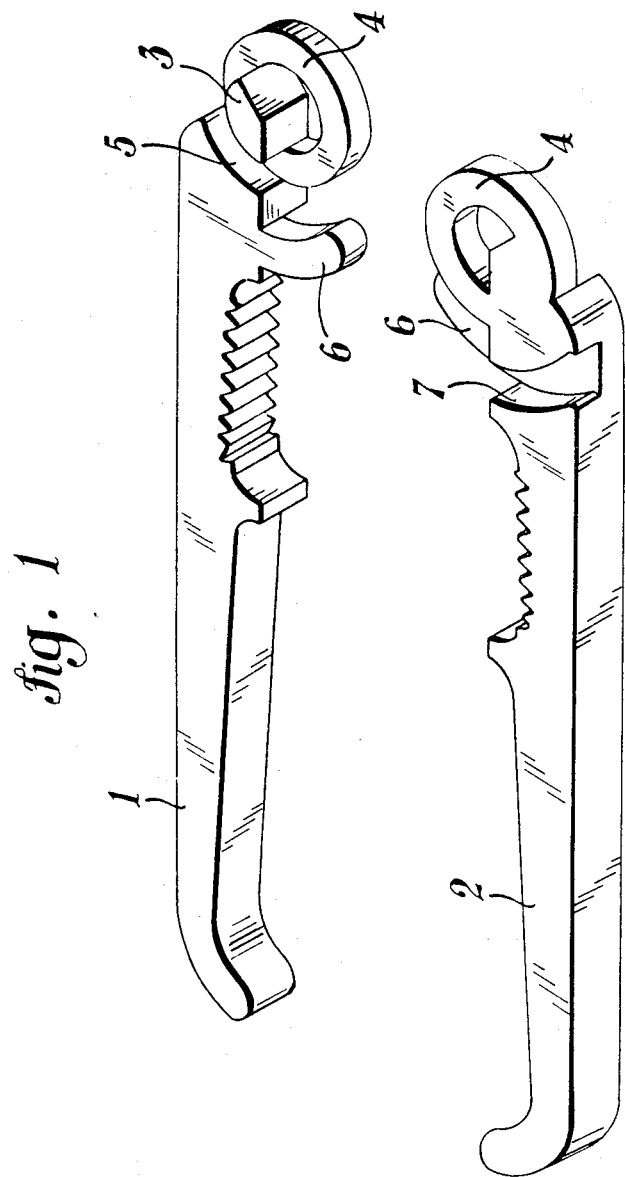
FIG. 1 shows two twin elements forming a nutcracker.

Referring to the drawings, a tool is shown pursuant to the invention consisting of two perfectly identical twin elements 1 and 2, molded in the same die. Each element has a cylindrical sector shaped projection 3 surrounded by an annular element 4 which extends around said sector projection 3 forming an eyelet having a cylinder sector shape which completes the cylinder form of the projection 3. Concentric to the projection 3 is provided a circular groove 5 which has a width and thickness corresponding to the width of the annular element 4. Also concentric to the cylinder sector shaped projection 3, each twin element 1, 2 has a circle sector tongue 6 and a corresponding seat 7 in the other element.

Coupling.together of the two elements is a very quick and simple operation. It is only necessary to introduce the projection 3 of one element into the eyelet of the other element, while these elements 1 and 2 are kept in an opening end position. The circular tongues 6 enter the corresponding seats 7, preventing axial displacement and thereby also preventing the separation of the two elements from one anther during an active stroke, the range of which is obviously determined by the angle between the projections 3.

Preferably, the above disclosed tool is obtained by a sintering technique, since beside the advantages of the hinge itself, other advantages are attained, such as a high dimensional precision, a lower weight, a good finishing of the details and above all a lower price per unit, particularly in the case of mass production.

Obviously, the tool as disclosed above may also be produced using other powder techniques or technologies. Also, the hinge as disclosed above can be adapted for several uses, different from that herein described.

While the present invention has been illustrated and described as embodied in a nut cracker, it is not intended to be limited to the details shown, since various modifications and structural changers may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters Patent is set forth in the appended claims.

I claim:

1. A hinge arrangement, comprising two identical twin elements pivotable relative to one another about a pivot axis, each said element having a base portion with a circle sector surface with a center conciding with said pivot axis and formed with a predetermined width, an annular element defining a circular hole and having a width equal to half of said circle sector surface width, said annular element being connected to said circle sector surface so as to be concentric thereto, a cylinder sector shaped projection located in said circular hole so as to define an eyelet together with said annular element, said eyelet completing the cylindrical shape of said projection, said projection projecting from said annular element so as to form a circle sector groove together with said annular element and said circle sector surface, said groove being formed concentric to said projection and said annular element for slidably accepting said annular element of the other twin element, a circle sector tongue projecting from said base portion, and a seat for slidably accepting said tongue of the other twin element, said tongue and said seat being located adjacent to said circle sector groove and also concentric to said annular element, whereby said projection, said annular element and said tongue of each of the two twin elements may be coupled, respectively, with said eyelet, said groove and said seat of the other of the two twin elements to form the hinge, said projection of each twin element cooperating together to form a pivot which has an opening end-of-stroke position in which said tongues are disengaged from said seats said circle sector tongues and said seats cooperating so as to hinder an axial displacement of said twin elements, thereby permitting disengagement of said twin elements only when said tongues are pulled out of·their respective seats in the opening end-of-stroke position.

2. A hand operated tool, comprising two identical twin elements formed by two twin lever elements pivotable relative to one another about a pivot axis, each said lever element having at its end a base portion with a circle sector surface with a center coinciding with said pivot axis and formed with a predetermined width, an annular element defining a circular hole and, having a width equal to half of said circle sector surface width, said annular element being connected to said circle sector surface so as to be concentric thereto, a cylinder sector shaped projection located in said circular hole so as to define an eyelet together with said annular element, said eyelet completing the cylindrical shape of said projection, said projection projecting from said annular element so as to form a circle sector groove together with said annular element and said circle sector surface, said groove being formed concentric to said projection and said annular element for slidably accepting said annular element of the other lever element, a circle sector tongue projecting from said base portion, and a seat for slidably accepting said tongue of the other twin element, said tongue and said seat being located adjacent to said circle sector groove and also concentric to said annular element, whereby said projection, said annular element and said tongue of each of the two twin elements may be coupled, respectively, with said eyelet, said groove and said seat of the other of the two twin elements to form the hinge, said projection of each twin element cooperating together to form a pivot which has an opening end-of-stroke position in which said tongues are disengaged from said seats, said circle sector tongues and said seats cooperating so as to hinder an axial displacement of said twin elements, thereby permitting disengagement of said twin elements only when said tongues are pulled out of their respective seats in the opening end-of-stroke position.

3. A nut-cracker, comprising two identical twin elements formed by two twin arms pivotable relative to one another about a pivot axis, each said arm having at its end a base portion with a circle sector surface with a center coinciding with said pivot axis and formed with a predetermined width, an annular element defining a circular hole and, having a width equal to half of said circle sector surface width, said annular element being connected to said circle sector surface so as to be concentric thereto, a cylinder sector shaped projection located in said circular hole so as to define an eyelet together with said annular element, said eyelet completing the cylindrical shape of said projection, said projection projecting from said annular element so as to form a circle sector groove together with said annular element and said circle sector surface, said groove being formed concentric to said projection and said annular element for slidably accepting said annular element of the other arm, a circle sector tongue projecting from said base portion, and a seat for slidably accepting said tongue of the other twin element, said tongue and said seat being located adjacent to said circle sector groove and also concentric to said annular element, whereby said projection, said annular element and said tongue of each of the two twin elements may be coupled, respectively, with said eyelet, said groove and said seat of the other of the two twin elements to form the hinge, said projection of each twin element cooperating together to form a pivot which has an opening end-of-stroke position in which said tongues are disengaged from said seats, said circle sector tongues and said seats cooperate so as to hinder an axial displacement of said twin elements, thereby permitting disengagement of said twin elements only when said tongues are pulled out of their respective seats in the opening end-of-stroke position, and each said arm having a cracking surface formed to accept a nut and located on each said arm so that said cracking surfaces face each other, said cracking surfaces acting so as to crack the nut when said arms are moved toward one another.

* * * * *